United States Patent [19]

Nitzsche et al.

[11] 3,878,281

[45] Apr. 15, 1975

[54] PROCESS FOR THE MANUFACTURE OF INTERMEDIATES FOR THE PRODUCTION OF MOLDED ELECTRIC INSULATING ELEMENTS

[75] Inventors: Siegfried Nitzsche; Ignaz Bauer; Bernward Deubzer; Wolfgang Seidel, all of Burghausen, Germany

[73] Assignee: Wacker-Chemie GmbH, Munich, Germany

[22] Filed: Apr. 12, 1973

[21] Appl. No.: 350,452

[30] Foreign Application Priority Data

Apr. 12, 1972 Germany............................ 2217610

[52] U.S. Cl. ................... 264/86; 264/91; 264/110; 264/126; 264/219
[51] Int. Cl. ............................................. B28d 1/32
[58] Field of Search ............ 264/91, 110, 126, 311, 264/86–87, 219; 260/29.2 M

[56] References Cited

UNITED STATES PATENTS

| | | | |
|---|---|---|---|
| 3,133,217 | 5/1964 | Wohlferth et al................... | 264/110 |
| 3,523,061 | 8/1970 | Purvis................................ | 264/110 |

FOREIGN PATENTS OR APPLICATIONS

| | | | |
|---|---|---|---|
| 1,239,607 | 1967 | Germany............................ | 264/110 |

Primary Examiner—Robert F. White
Assistant Examiner—Gene Auville

[57] ABSTRACT

This invention relates to a method for manufacturing intermediates for the production of molded electric insulating elements by adding an aqueous suspension containing mica and thermosetting organopolysiloxane resins which are solid at ambient temperature to a molding device, removing the water by mechanical means, heating the mold thus obtained for from 0.1 to 60 seconds at a temperature between the softening point of the organopolysiloxane resin and 99°C. and thereafter drying the resultant mold.

5 Claims, No Drawings

PROCESS FOR THE MANUFACTURE OF INTERMEDIATES FOR THE PRODUCTION OF MOLDED ELECTRIC INSULATING ELEMENTS

The invention relates to a method for manufacturing intermediates which are used in the production of molded electric insulating elements. More particularly, the invention relates to an improved method for manufacturing intermediates used in the production of molded electric insulating elements which are obtained from mica and thermosetting resins. These intermediates are prepared by applying an aqueous suspension consisting of mica and thermosetting resins to a molding device; removing the water by mechanical means and the mold thus obtained is heated for from 0.1 to 60 seconds at a temperature between the softening point of the organopolysiloxane resin and 99°C. and thereafter the resultant mold is dried.

Methods for the production of electric insulating molds by the pressure and heat-hardening of intermediates consisting of mica and binding agents are well known, especially, the so-called "prepregs" and "heated micanite prepregs." It is essential that these intermediates be self-supporting and that they can be handled easily without damage. Also, it is essential that they be free of tackiness at room temperature and that they be capable of being stored at room temperature without adhering together.

In comparison with the prior process for the production of intermediates, whereas mica molds were subsequently impregnated with organopolysiloxane resin solutions, the process of the instant invention has several advantages. One advantage of the present process is that at least one manufacturing step is eliminated. Also the process of this invention eliminates the necessity of working with highly flammable and/or toxic solvents, thereby eliminating the necessity of making provisions for recovering the same.

In comparison with the well-known processes in which an aqueous organopolysiloxane resin emulsion or solution was employed for the preparation of the aqueous mica suspension from which the intermediates were produced, or where the mica moldings were subsequently impregnated with aqueous organopolysiloxane resin emulsions or solutions, the process of the present invention also offers the advantage of eliminating the expense for the production, storage and transportation of the emulsions or solutions. Of even greater importance is the fact that the cleaning of the equipment which produced the intermediates, from mica particles is eliminated while at the same time avoiding the loss of resin from the solution or emulsion.

Compared to the heretofore known process (DT-AS 1,239,607) for the production of molds from an aqueous mica suspension and a binding agent, in which the silicone resin particles have diameters which are considerably larger than those of the mica flakes, the process of the present invention utilizes silicone resins (i.e. organopolysiloxane resins) having a greater proportion of fines, i.e. particles whose diameters are smaller than those of the mica particles. Furthermore the process of this invention will provide for the handling of the intermediates for the manufacture of electric insulating molds prior to drying, an embodiment which greatly facilitates their transportation to the drying equipment. Finally, the process of this invention avoids the formation of bubbles or holes in the molds, such as occur in repeating the process described in the above mentioned German Patent under the conditions indicated, when organopolysiloxane resins are used as binding agents.

It is therefore an object of this invention to provide a process for manufacturing intermediates for the production of molded electric insulating elements. Another object of this invention is to provide a process for manufacturing intermediates which avoids the use of highly flammable and/or toxic solvents. A further object of this invention is to provide a process which avoids the formation of bubbles or holes in the molds.

The foregoing objects and others which will become apparent from the following description are accomplished in accordance with this invention, generally speaking, by providing a process for manufacturing intermediates for the production of electric insulating molds. In this process, an aqueous suspension prepared from mica having laminating properties and thermosetting organopolysiloxane resins which are solid at ambient temperature, is placed in a molding device, the water is removed by mechanical means and the form thus obtained is dried. The method is further characterized by the fact that between the water removal step and the drying step, the form thus obtained is heated for from 0.1 to 60 seconds at a temperature between the softening point of the organopolysiloxane resin and 99°C. The heating step is preformed prior to the removal of the mold from the support on which it was formed during water removal.

This invention can be carried out either continuously or intermittently. It is particularly well suited to the preparation of prepregs, which are intermediates in the production of heating micanite [see VDE 0332/11.68, "Specifications for Mica Products," of the "Verband Deutscher Elektrotechniker" (Association of German Electrical Engineers)], effective Nov. 1, 1968, (Section 3a, 1.2). Mica having laminating characteristics is fine mica, i.e., chemically or physically decomposed mica (see the above mentioned VDE regulation Section 3b, 5).

Examples of thermosetting organopolysiloxane resins which are solid at room temperature are hydrolysates or mixed hydrolysates of methyltrichlorosilane which contain at least 0.1 percent by weight of Si-bonded hydroxyl groups and if desired, up to 3 percent by weight of SiOC-bonded alkyl groups having up to 10 carbon atoms, such as methoxy, ethoxy and/or isopropoxy groups. These hydrolysates may be mixed with up to 5 mole percent of dimethyldichlorosilane or methyltrimethoxysilane and if desired up to 5 mole percent of dimethyldiethoxysilane. Additional examples of thermosetting organopolysiloxane resins which are solid at ambient temperature are organopolysiloxanes which contain at least 0.1 weight percent of Si-bonded hydroxyl groups with an average of from 0.3 to 1.2, preferably about 1.1, phenyl groups per Si atom and an overall average of from 0.9 to 1.7, preferably about 1.1 SiC-bonded organic groups per Si atom, as well as up to 3 percent by weight of SiOC-bonded alkyl groups such as methoxy, ethoxy and/or isopropoxy groups. The remaining SiC-bonded organic groups which are generally present in addition to the phenyl groups are preferably methyl groups.

In order that an aqueous suspension can be prepared from these resins, they must be insoluble in water as well as existing in a solid and finely divided form at ambient temperature. Although the diameter of the resin particles is not critical, it should not exceed about 0.5 mm. The diameter of the resin particle, however, should be of sufficient size to preclude the formation of a collodial suspension. Thermosetting organopolysiloxane resins which are solid at ambient temperature are described in British Pat. Nos. 1,001,743 and 1,054,352.

In order to accelerate the hardening, thermosetting organopolysiloxane resins which are solid at ambient temperature are often used in combination with a hardening catalyst. The hardening catalyst must be inactive at ambient temperature and must not cause any undesired hardening of the resin, not only during the steps of the process of forming the intermediate according to this invention, but also at the drying temperature. Examples of suitable hardening catalysts are inorganic lead compounds, such as basic lead carbonate [$Pb_3(OH)_2(CO_3)_2$], lead carbonate ($PbCO_3$), lead monoxide and lead dioxide and if desired in combination with 0.1 to 15 weight percent (based on the weight of the organopolysiloxane) of ketones and/or metal enolates, which have a boiling point of at least 140°C. (at 760 Torr absolute) and a melting point below the temperature used in the formation of the precursors. Examples of suitable ketones or metal enolates are acetylacetone and aluminum acetylacetonate (German Pat. Application. No. 1,920,691, of Nov. 5, 1970). When inorganic lead compounds are used as hardening catalysts, they are usually used in quantities of from 0.01 to 5 weight percent, based on the weight of the organopolysiloxanes. Further examples of suitable hardening catalysts are mixtures of aluminum and zinc acetylacetonates or mixtures of aluminum and titanium acetylacetonates. As is generally known, the lead compounds described above as well as mixtures of metal enolates can be used in combination with higher alcohols or carboxylic acids.

The thermosetting organopolysiloxane resins which are solid at ambient temperature are used preferably in an amount of from 2 to 20 weight percent, preferably from 4 to 12 weight percent based on the total weight of the mica and the organopolysiloxane resin.

The amount of water used for the preparation of the aqueous suspension of mica having laminating characteristics and thermosetting organopolysiloxane resins which are solid at ambient temperature is not critical. A sufficient amount must be used to obtain a suspension, i.e., enough water should be used in order that each particle is surrounded by water. The upper limit on the amount of water is determined only by the desired thickness of the intermediate, or by economic considerations. That is, the thicker the initial products desired, e.g. in the shaping by the screen of a paper machine, the smaller the amount of water which must be used for the preparation of the initial products. The amount of water can, vary from about 50 to 1200 weight percent based on the weight of the mica.

The forming support can, e.g., be a suction filter (Buchner funnel), a shaping screen, a filter cloth or the screen network of a paper machine.

The mechanical means by which the water is removed from the suspension of mica having laminating characteristics and thermosetting organosiloxane resins which are solid at ambient temperature can consist in screening, suction, filtration and/or centrifugation. In using these techniques, a sheet-like form is obtained in which the mica particles are oriented parallel to the surface and between the mica particles are resin particles and possibly particles of the hardening catalyst.

During the heating step, at least a portion of the resin particles should become plastic, soften, or melt and should thereby cement the mica particles together. The heating step ranges from about 0.1 to 60 seconds and is carried out at a temperature between the softening point of the organopolysiloxane resin and 99°C. The brief, shock-like heat treatment is insufficient to harden the resin. The heating step is carried out after the water has been removed by mechanical means, but prior to the drying step. In addition the heating step is carried out prior to the removal of the mold from the support on which it was formed, or before the mold resting on a flexible support such as a filter paper, a filter cloth, or a shaping screen, is lifted from the flexible support site during the water removal. Heat carriers with temperatures of from 70° to 90°C. are preferred.

The brief, shock-like heat treatment, which is insufficient to harden the resin, can be conducted, for example, by spraying or pouring hot water over the form obtained by the removal of water by mechanical means, or with hot steam which, if applicable, can be superheated, or by means of heating baths, hot air, heated rollers as heat transfer agents and/or thermal radiation. The use of hot water is preferred. Generally 2 to 3 liters of water at 90°C. are required for the preparation of intermediates which, after hardening under heat and pressure, result in a sheet having dimensions of about 1500 × 300 × 0.5 mm. Hot steam is especially suitable for the preparation of intermediate products which, after hardening under heat and pressure, result in a sheet with dimensions of about 1500 × 300 × 0.5 mm. The brief, shock-like heat treatment which is insufficient to harden the resin is carried out by subjecting the form obtained by the removal of the water to steam at a temperature of about 125°C. for 20 to 30 seconds.

In order to prevent the mold consisting of mica and a binding agent from adhering to the support or other processing parts during the brief, shock-like heat treatment, especially when a medium other than water or steam is used to conduct the shock-like treatment, it may be expeditious to coat the supports or other equipment which will come in contact with the mold, such as filter cloths or rollers, with an organopolysiloxane resin-repelling coating such as polytetrafluoroethylene and/or to cool the form consisting of mica and binding agent to room temperature immediately after the shock-like heat treatment. This cooling may also be required when the form consisting of mica and binding agent is removed, before drying from the support on which it was formed, or when the form is on a flexible support and is lifted from the site occupied by the flexible support during the removal of the water by mechanical means, if hot water or steam is not used at a temperature below about 130°C. as the heat transfer agent. Cooling can be carried out by spraying or pouring cold water or by means of cooling baths, cold air and/or cooled rollers. Each of the cooling methods mentioned can be combined with each of the heating methods previously described.

The following steps can be carried out with a suspension of mica and thermosetting organopolysiloxane resin on a Fourdrinier machine, such as is used in paper production. The water is removed from the suspension by screening and the form remaining on the screen is passed through a heating tunnel at 150°C. for 30 seconds, using radiant heating or heatable rollers, as a source of heat. The temperature of the form consisting of mica and binding agent does not exceed about 95°C. and immediately thereafter, cooling is accomplished with a cooling roller.

The drying of the form consisting of binding agent and mica, which contains residual water, can occur by means of hot air, heated rollers, thermal radiation or heating tables. In this step, it is advantageous not to exceed a temperature of about 90°C. because it was found that with the relatively long action of high temperatures, premature hardening of the organopolysiloxane resin and/or the formation of voids in the prepreg can occur. During drying, all of the water in excess of 1 percent by weight is removed, because otherwise the finished product, which was produced from the prepregs by hardening with pressure and heat, will often contain voids.

Further processing of the intermediates prepared according to the process of this invention may occur in any manner known in the art for processing intermediates consisting of a binding agent and mica into electric insulating molds by hardening under pressure and heat.

Various embodiments of this invention are illustrated in the following examples in which all parts are by weight unless otherwise specified.

The values given in the following examples for tensile strength and water absorption of electric insulating molds, which were produced from intermediates prepared according to the invention, are determined in accord with DIN (German Industrial Standard) 53,455 or DIN 53,475.

EXAMPLE 1

Approximately 100 parts of finely ground mica is combined with about 15 parts of methylpolysiloxane resin having a softening point at 80°C., a methyl to silicon ratio of 1.1:1, an Si-bonded hydroxyl content of 1.5 weight percent and an ethoxy content of 0.8 weight percent. The resin was prepared from methyltrichlorosilane and dimethyldichlorosilane in a 95:5 mole ratio by adding an approximately equimolar mixture of water and ethanol to a toluene solution, heated under reflux and maintaining the reflux throughout the reaction. The hydrolysate was washed with water and evaporated to dryness and the residue was ground to a particle size of not more than about 0.2 mm. About 0.015 parts of basic lead carbonate having a lead content of 81 weight percent, consisting of particles below about 0.1 mm. is added to the mica-resin mixture and the entire mixture is suspended in 50 parts of water by means of a high-speed laboratory stirrer. The water is removed from the suspension by suction through a Buchner funnel with a filter surface area of 125 cm$^2$.

About 300 parts of water at a temperature of from 90° to 99°C. is then drawn through the filter cake. The latter is then lifted off the filter paper and removed from the funnel. This is easily done without any damage to the form consisting of the binding agent and the mica, which contains residual water. This form is stored in a drying oven at 60°C. for 48 hours, after which the water content is less than 1 weight percent. The filter cake is then heated to 175°C. for one hour in a hydraulic press at a pressure of 8 kg/cm$^2$, the temperature is reduced to 100°C. and the pressure is relieved. The result is a micanite sheet of 4 mm. thickness and a specific gravity of 2.2 g/cm$^3$.

The plate is removed from the press and cut into standard small bars, using a high-speed diamond saw, for the mechanical strength measurement. The tensile strength value is 800 kg/cm$^2$. The water absorption value is less than 1 weight percent.

EXAMPLE 2

Finely ground mica having an average particle diameter of about 0.001 mm. is mixed in a Hollander with 10 weight percent (based on the weight of the mica) of a powdered phenylmethylpolysiloxane resin having a melting point of 65°C., an average of 0.75 phenyl groups per silicon atom and an overall average of 1.0 SiC-bonded methyl and phenyl groups per silicon atom, 3.5 weight percent of Si-bonded hydroxyl groups and 0.5 weight percent of ethoxy groups. About 0.1 weight percent (based on the weight of the organopolysiloxane resin) of finely divided lead monoxide is added to the mica-resin mixture and the entire mixture is suspended in 100 weight percent of water (based on the weight of the mica). The suspension is placed on a Fourdrinier machine, such as used in the production of paper, where it is sprayed for about 5 seconds with water at about 85°C. to increase the residual water content to about 25 weight percent before removing it from the machine. The sheet-like form thus obtained is cut into smaller pieces, during which no undesired damage occurs. The pieces are then stored in a drying oven at 60°C. for 48 hours, in order to dry them to a water content of at least 1 weight percent. The prepregs are then ready for processing and can be stored for a relatively long time.

In each case, ten pieces of these initial products are stacked on top of each other, placed in a preheated hydraulic press for 15 minutes of heating at 250°C. under a pressure of 10 kg/cm$^2$ and cooled to room temperature in a second press which is likewise under a pressure of 10 kg/cm$^2$ to convert them to a heating micanite. The tensile strength value is 1000 kg/cm$^2$ and the water absorption value is less than about 0.5 weight percent.

EXAMPLE 3

Finely ground mica is combined with 10 weight percent (based on the weight of the mica) of a methylpolysiloxane resin consisting of 95 mole percent methylsiloxane units and 5 mole percent dimethylsiloxane units and having a softening point of 90°C. The resin contains about 0.6 weight percent Si-bonded hydroxyl groups and 2 weight percent ethoxy groups and consists only of particles below about 0.5 mm. Approximately 0.1 weight percent (based on the weight of the organopolysiloxane resin) of lead monoxide, consisting only of particles less than about 0.01 mm. is added to the mica-resin mixture and the entire mixture is suspended in 1000 weight percent of water. The water is removed from the suspension in a screening centrifuge, through a filter cloth which is impregnated with polytetrafluoroethylene and which lies on the inner side of the centrifuge screen. While the centrifuge is still operating, the filter cake is sprayed with a volume of water, at 95°C. equal to its own volume. After this water is centrifuged off, the filter cloth, together with the filter cake, is removed from the centrifuge. The filter cake is heated at 75°C. for 100 hours on a level timber frame, in order to dry it to a water content of at most 1 weight percent. The product thus obtained whose width corresponds to the depth of the centrifuge and whose length corresponds to the circumference of the edge of the centrifuge, is heated to 200°C. for 5 minutes in a hydraulic press at a pressure of 25 kg/cm². The sheet thus obtained is very quickly transferred, while still hot, to an adjacent cold press and cooled to room temperature under a pressure of 25 kg/cm². The heating micanite thus obtained has a tensile strength of 750 kg/cm² and a water absorption of 2 weight percent.

Although specific examples of the invention have been described herein, it is not intended to limit the invention solely thereto, but to include all the variations and modifications falling within the spirit and scope of the appended claims.

What is claimed is:

1. An improved method for preparing intermediate products for manufacturing electric insulating molded forms in which an aqueous suspension containing mica having laminating characteristics and thermosetting organopolysiloxane resin particles having a diameter up to about 0.5 cm. and which are solid at ambient temperature is applied to a shaping support, said resin particles are present in an amount of from 2 to 20 percent by weight based on the total weight of the organopolysiloxane resin and mica, water is removed by mechanical means and the form thus formed is removed from the support and dried, the improvement which comprises heating the form after removing the water by mechanical means and prior to removing the form from the support on which it was formed to a temperature between the softening point of the organopolysiloxane resin and 99°C. for from 0.1 to 60 seconds.

2. The method of claim 1 wherein the form is heated from 0.1 to 30 seconds to a temperature of from 70° to 90°C.

3. The method of claim 1 wherein the form is heated by means of heat transfer agents.

4. The method of claim 1 wherein the form is heated by means of hot water.

5. The method of claim 1 wherein the aqueous suspension contains a hardening catalyst.

* * * * *